Figure 1:
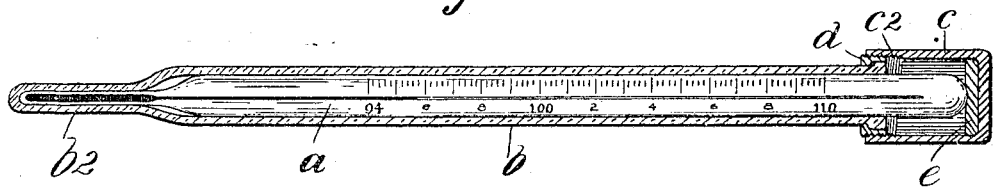

No. 801,681. PATENTED OCT. 10, 1905.
C. NURNBERG.
CLINICAL THERMOMETER.
APPLICATION FILED SEPT. 16, 1903.

WITNESSES

INVENTOR
Charles Nurnberg
BY
Edgar Tate & Co.
ATTORNEYS

UNITED STATES PATENT OFFICE.

CHARLES NURNBERG, OF NEW YORK, N. Y., ASSIGNOR TO SOLOMON CHARLES HIRSCHBERG, OF NEW YORK, N. Y.

CLINICAL THERMOMETER.

No. 801,681.  Specification of Letters Patent.  Patented Oct. 10, 1905.

Application filed September 16, 1903. Serial No. 173,399.

*To all whom it may concern:*

Be it known that I, CHARLES NURNBERG, a citizen of the United States, residing at New York, in the county of New York and State of New York, have invented certain new and useful Improvements in Clinical Thermometers, of which the following is a specification, such as will enable those skilled in the art to which it appertains to make and use the same.

This invention relates to clinical thermometers; and the object thereof is to provide means whereby the same thermometer may be used for the purpose of testing the temperature both of the rectum and the mouth without the necessity of cleansing or sterilizing the thermometer between the two operations in order to avoid transferring a local disease from one organ to another.

The invention is fully disclosed in the following specification, of which the accompanying drawings form a part, in which the separate parts of my improvement are designated by suitable reference characters in each of the views, and in which—

Figure 2:
Figure 3:
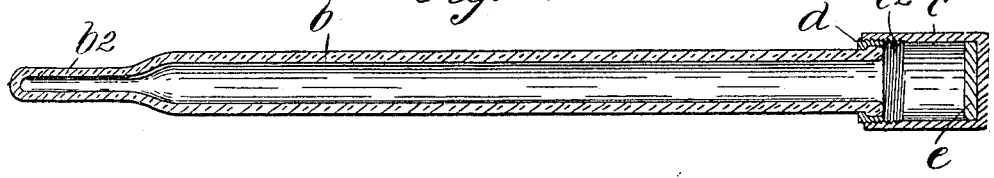

Figure 1 is a sectional side view of my improved clinical thermometer, in which the thermometer proper is shown in a transparent casing from which it is removable; Fig. 2, a side view of the clinical thermometer removed from the casing, and Fig. 3 a longitudinal section of the casing.

In the drawings forming part of this specification I have shown at $a$ an ordinary clinical thermometer provided in the usual manner with a reduced end portion $a^2$ and the usual scale $a^3$, and in the practice of my invention I provide a casing $b$, which is composed of glass or other transparent material and is of the same shape as the thermometer $a$ and which is hollow and adapted to receive the said thermometer, as shown in Fig. 1. The casing $b$ is provided at one end with a reduced member or extension $b^2$, adapted to receive the end $a^2$ of the thermometer, and said casing is open at the opposite end and adapted to be closed by a removable cap $c$, which may be made of any preferred material. In the construction shown a collar $d$ is secured to the open end of the casing $b$ and is threaded, and the cap $c$ is also open at one end and threaded, as shown at $c^2$, and adapted to be connected with the collar $d$, as shown in the drawings. Within the closed end of the cap $c$ is preferably placed a disk $e$, which forms a cushion against which the larger end of the thermometer $a$ abuts when the casing $b$ is closed. The casing $b$ is preferably composed of glass, and the scale on the thermometer $a$ may be clearly seen therethrough, as may also the position of mercury within the thermometer, the said mercury being indicated in black in Figs. 1 and 2.

When the thermometer $a$ is inclosed in the casing $b$, the device may be used for testing the temperature of the rectum, and by removing the thermometer from said casing it may be used for testing the temperature of the mouth in the usual manner, and this, as will be understood, may be done without cleansing or disinfecting the thermometer, and these operations may be reversed when desired.

In practice a number of the casings $b$ may be provided and kept on hand at all times, and when the device as a whole has been once used for either of the purposes specified the casing may be removed and thrown away, and a new casing may be provided whenever necessary.

By means of my invention I avoid the necessity of cleansing or disinfecting the thermometer after using it and when it is desired to use it for another purpose, and the advantages of this will be apparent when it is understood that the proper means for disinfecting or cleansing a thermometer of this class may not always be at hand.

My invention is not limited to the material from which the casing $b$ is formed, all that is necessary in this case being that said casing be transparent, and any suitable detachable cap may be provided for the open end thereof.

Having fully described my invention, what I claim as new, and desire to secure by Letters Patent, is—

A clinical thermometer comprising a thermometric tube of the usual form provided with a reduced end portion and the usual scale and a removable casing composed of transparent material open at one end and closed at the other, the closed end being reduced to correspond with the reduced end of the thermometric tube and being adapted to receive said reduced end of said tube when the latter is inserted into said casing whereby the thermometric tube may be used with or without said casing in position, said casing being also provided with a detachable cap at the open end which is adapted to close the same and to hold the thermometric tube in position therein, substantially as shown and described.

In testimony that I claim the foregoing as my invention I have signed my name, in presence of the subscribing witnesses, this 15th day of September, 1903.

CHARLES NURNBERG.

Witnesses:
F. A. STEWART,
C. J. KLEIN.